United States Patent
Striegler et al.

(10) Patent No.: US 7,638,208 B2
(45) Date of Patent: Dec. 29, 2009

(54) GLASS CERAMIC PLATE PROVIDING A COOKING SURFACE FOR A COOKING APPARATUS AND HAVING A COATING ON AN UNDERSIDE THEREOF AND COATING PROCESS FOR MAKING SAME

(75) Inventors: Harald Striegler, Ockenheim (DE); Dietmar Wennemann, Albig (DE); Annette Lukas, Rodenbach (DE)

(73) Assignee: Schott AG, Mainz (DE)

( * ) Notice: Subject to any disclaimer, the term of this patent is extended or adjusted under 35 U.S.C. 154(b) by 28 days.

(21) Appl. No.: 11/527,311

(22) Filed: Sep. 26, 2006

(65) Prior Publication Data
US 2008/0035896 A1 Feb. 14, 2008

(30) Foreign Application Priority Data
Oct. 1, 2005 (DE) .................. 10 2005 046 570

(51) Int. Cl.
B32B 9/04 (2006.01)
(52) U.S. Cl. ................... 428/690; 219/452.12; 428/434
(58) Field of Classification Search ................. 219/443, 219/460.1, 452.12; 501/4, 7, 68; 428/690
See application file for complete search history.

(56) References Cited

U.S. PATENT DOCUMENTS

| 6,043,171 | A | 3/2000 | Siebers et al. |
| 6,515,263 | B2 | 2/2003 | Mitra et al. |
| 6,914,223 | B2 | 7/2005 | Krause et al. |
| 2002/0026932 | A1 | 3/2002 | Mitra et al. |
| 2002/0084263 | A1* | 7/2002 | Wennemann et al. .... 219/460.1 |
| 2003/0019864 | A1 | 1/2003 | Krause et al. |
| 2005/0143246 | A1* | 6/2005 | Comte et al. .................. 501/4 |
| 2005/0172829 | A1 | 8/2005 | Shimatani et al. |
| 2005/0224491 | A1 | 10/2005 | Vilato et al. |

FOREIGN PATENT DOCUMENTS

DE 38 28 799 3/1989

(Continued)

OTHER PUBLICATIONS

G. Landgraf: "Gold in Decoration of Glass and Ceramics" Gold:Progress Inchemistry, Biochemistry and Technology, John Wiley & Sons, 1999 (in English).

*Primary Examiner*—Timothy M Speer
*Assistant Examiner*—Lauren Robinson
(74) *Attorney, Agent, or Firm*—Michael J. Striker

(57) ABSTRACT

The glass ceramic plate for a cooking apparatus is transparent to visible light and IR radiation and has a noble metal film on its underside. The noble metal film is composed of an alloy of gold, platinum and/or palladium, which imparts a reflective property to it. It contains from 0 to 5 percent by weight, in relation to a total metal content, of silver, copper, silicon, bismuth and other metals that are not noble metals. The glass ceramic plate coated with the noble metal film has a spectral transmission of 0 to 12% in the infrared region of the spectrum. When a decoration consisting of a grid of unsymmetrically distributed elements is provided on the topside of the glass ceramic plate, defects in the glass ceramic material can be concealed. The invention also includes a method of coating.

25 Claims, 1 Drawing Sheet

FOREIGN PATENT DOCUMENTS

| | | |
|---|---|---|
| DE | 197 21 737 | 11/1998 |
| DE | 100 14 373 | 10/2001 |
| EP | 0 296 312 | 12/1988 |
| EP | 0 771 765 | 5/1997 |
| EP | 0 861 014 | 8/1998 |
| EP | 1 170 264 | 1/2002 |
| EP | 1 267 593 | 12/2002 |
| EP | 1 364 924 | 11/2003 |
| EP | 1 505 354 | 2/2005 |
| GB | 2 209292 | 5/1985 |
| JP | H7-17409 | 3/1991 |
| JP | 2003168548 | 6/2003 |
| JP | 2004193050 | 7/2004 |
| JP | 2004205190 | 7/2004 |
| JP | 2004342609 | 12/2004 |
| WO | 2003/084891 | 10/2003 |
| WO | 03/098115 | 11/2003 |

\* cited by examiner

GLASS CERAMIC PLATE PROVIDING A COOKING SURFACE FOR A COOKING APPARATUS AND HAVING A COATING ON AN UNDERSIDE THEREOF AND COATING PROCESS FOR MAKING SAME

BACKGROUND OF THE INVENTION

1. The Field of the Invention

The present invention relates to a glass ceramic plate providing a cooking surface of a cook top or cooking apparatus, which is composed of a glass ceramic material which is transparent to visible light as well as IR radiation and which is provided with a coating on an underside thereof in the form of a noble metal film. The invention also relates to a coating on an underside of the glass ceramic plate. The present invention relates to a process for coating the underside of the glass ceramic panel.

2. Related Art

Glass ceramic plates, which are used in cooking devices to provide cooking surfaces, so-called glass ceramic cooking surfaces, are typically darkly colored in the melt for the European market, so that they appear black when viewed from the top and prevent viewing of components in the interior of the cooking devices. Generally under intense illumination from above, especially in the modern kitchens, e.g. under conventional halogen lighting, cables or other components in the interior of the cooking devices may still be visible from above. In order to provide an outstandingly opaque cooking surface, an opaque silicone coating is applied to the typically knobbed underside of the glass ceramic plate. The opaque silicone coating must be generally omitted in the display area and in the vicinity of the light of the residual-heat signaling device, so that the light indicator signals are visible to the user. Generally the knobbed structure on the underside of the glass ceramic plate in the vicinity of the light indicator devices (display area and residual heat indicator) is dressed with a smooth colorless silicone coating, so that the observable signals are not distorted.

Currently colorless glass ceramic plates, i.e. glass ceramic plates that are not colored in the melt, which are transparent for visible light and smooth on both sides, are widely used to provide cooking surfaces, especially in Japan. These glass ceramic plates are coated on their undersides in a special way, so that the cooking apparatus interior cannot be viewed from above through them. The cooking surfaces on the colorless smooth glass ceramic plates have the advantage that changing the coatings on the undersides of the glass ceramic plates can change their color in a simple manner. Thus the same colorless glass ceramic plate can be made to appear silver, yellow, green, or any other color besides black by means of the underside coating. Because this glass ceramic plate has no knobs on its underside illuminated cooking zone indicators, displays, or residual heat indicators can be directly mounted on the cooking surface underside and are sufficiently visible, in as much as the opaque coating is omitted in these areas.

Noble metal films used as underside coatings are described in Japanese Disclosure Document H7-17409. Furthermore EP 1,267,593 B1 describes an underside coating based on a glass flux and an inorganic pigment, which can be provided with an additional coating based on organic compounds (silicones, polyamides, among others). DE 100 14 373 C2 mentions sol-gel coatings besides noble metal coatings. Sputtered coatings are mentioned in WO 03/098115 A1.

These coatings have several disadvantages as underside coatings for glass ceramic plates that provide cooking surfaces, as shown by the following results described hereinbelow.

The noble films described in JP H7-17409 are not resistant to burned food because of their content of transition metals, e.g. silver. However the resistance of the underside coating to food is necessary for underside coatings in cooking devices with gas burners, since the food can reach the underside of the glass ceramic plate providing the cooking surface through the openings in the glass ceramic plate for the gas burners, which are necessary for operation of the gas burners. The known solutions are not suitable for a gas cooking apparatus.

Since the noble metal films described in JP H7-17409 are lustrous metal films and reflect light, defects or faults in the glass ceramic (e.g. small bubbles, scratches, or crystalline inclusions or stones) are reflected, i.e. doubled, by these noble metal layers and they are thus especially clearly visible. However small defects in the glass ceramic, such as scratches or bubbles, cannot be completely avoided during production of colorless glass ceramic plates that provide cooking surfaces, so that the exclusive coating of colorless glass ceramic plates with a noble metal preparation leads to a high rejection rate and thus to an uneconomical process.

Porous underside coatings made of glass flux and inorganic pigments according to EP 1,267,593 B1 or based on sol-gel methods described in DE 100 14 373 C2 have similarly proven to be unsuitable for use in gas cooking appliances, because food reaching the undersurface of the glass ceramic plate already forms clearly visible flecks without temperature treatment. Likewise no permanent protection could be obtained by using the sealing silicone coating, as proposed in the above-mentioned document, since the silicone coating cannot withstand the higher temperature in the vicinity of the gas burners (about 450 to 550° C.). Also the destruction of the silicone layer leads to a definite color change (a brightening) of the underside coating.

Sputtered coatings according to the WO reference—even when they were sufficient for the chemical resistance and temperature resistance requirements—have the disadvantage that an expensive marking engineering, e.g. according to JP(A) 2004 342 609, is required for forming display windows or other openings for light signals.

SUMMARY OF THE INVENTION

The object of the present invention is to provide a glass ceramic plate, which provides a cooking surface of a cooking apparatus and which has an underside coating formed so that it has the following properties:

a) chemically resistant to food materials and the usual cleaning agents;

b) opaque under the usual lighting conditions in the kitchen;

c) simple to produce the coated areas;

d) resistant to temperatures up to 550° C.; and e) observable defects in the glass ceramic not perceived as troublesome.

This object and others, which will be made more apparent hereinafter, is attained in a glass ceramic plate forming a cooking surface of a cooking device, which is composed of a glass ceramic material, which is transparent to visible light as well as IR radiation and which has an underside coating in the form of a noble metal film.

According to the invention the noble metal film is composed of an alloy of gold and/or platinum and/or palladium, which imparts a reflective property to it, the content of the silver, copper, silicon, bismuth and other metals that are not noble metals in the alloy amounts to a maximum of 5% by weight, i.e. 0 to 5% by weight, in relation to the total metal content, and the spectral transmission of the coated glass ceramic plate amounts to less than 12%, i.e. 0 to 12%, in the infrared region of the spectrum.

The coating of the glass ceramic plate that provides the cooking surface with a noble metal coating or film, which has no or only small amounts (5% by weight or less in relation to the total metal content of the film) of silver, copper, silicon, tin, lead, bismuth, iron, cobalt, nickel, or other metals (for example all non-noble metals, also metals with negative standard potential) that are easily oxidizable by combustion of food materials (cooking oil, Soya, etc.) provides special advantages in the gas cooking range area. This sort of coating containing from 90 to <100% by weight, preferably 95 to <100% by weight, gold, platinum and/or palladium, in relation to the total amount of film material in the noble metal film, above all, has an extremely high chemical resistance, so that no discoloration is observable from the topside of the glass ceramic due to burned-on food materials or conventional cleaning materials.

Especially opaque coatings are obtained, when the noble metal preparation has a total noble metal content of from 5 to 50% by weight, especially from 10 to 20% by weight, in relation to the total amount of pigment paste comprising e.g. organometallic compounds, solvent, and resin prior to burning the pigment paste into the glass ceramic and when the coating thickness prior to burning in amounts to from 1 to 10μ, especially from 2 to 5μ. The noble metal preparation can be adjusted with the aid of a solvent and resin for screen printing, above all so that it is thixotropic, so that the structuring of the coating, e.g. with openings for display windows or a peripheral uncoated edge is possible in a technically simple manner. After burning in the paste the coating thickness of the noble metal coating of less than 1μ, preferably from 0.05 to 0.5μ, and especially from 0.1 to 0.2μ, is preferred. The noble metal preparation is burned in at temperatures over 600° C., usually at 780 to 850° C. and especially at a temperature of 830±10° C.

Because of the features according to the invention the spectral transmission of the underside coated glass ceramic plate amounts to from 0 to 4%, preferably from 0 to 1.7%, in the visible range, which correspond to a very high opacity.

The invention also concerns a method for providing the coating on the underside of the glass ceramic plate, which comprises the steps of:

a) preparing at least one noble metal preparation comprising the alloy of gold and/or platinum and/or palladium, which contains from 0 to 5% by weight of the silver, copper, silicon, bismuth, and the other metals that are not noble metals, in relation to a total metal content of the noble metal film;

b) applying the at least one noble metal preparation in at least one layer to a working undersurface of the glass ceramic plate in a layer thickness of from 1 to 10μ, preferably 2 to 5μ; and c) burning the at least one noble metal preparation applied in step b) into the working undersurface at a burn-in temperature greater than 600° C., preferably from 780 to 850° C.

The noble metal film is permanently thermally stable to temperatures of over 550° C., because of the chemical inertness of the noble metal, the film stabilizers contained in it (e.g. rhodium oxide) and the high melting point of the noble metal (gold, platinum, and palladium melt over 1000° C.).

Glass ceramic materials, which are suitable for the glass ceramic plates of the present invention, for example the colorless glass ceramic plates of the $Li_2O$—$Al_2O_3$—$SiO_2$ type, which are marketed for example by Schott AG and have a thermal expansion coefficient of $-10 \times 10^{-7}$ $K^{-1}$ to $+30 \times 10^{-7}$ $K^{-1}$ in a temperature range of 30 to 500° C., have a chemical composition expressed in terms of % by weight of elemental oxides in the following table I.

TABLE I

SUITABLE GLASS CERAMIC COMPOSITIONS

| Elemental Oxide | Oxide Proportions, % by wt | |
|---|---|---|
| $SiO_2$ | 66-70 | 50-80 |
| $Al_2O_3$ | >19.8-23 | 12-30 |
| $Li_2O$ | 3-4 | 1-6 |
| MgO | 0-1.5 | 0-5 |
| ZnO | 1-2.2 | 0-5 |
| BaO | 0-2.5 | 0-8 |
| $Na_2O$ | 0-1 | 0-5 |
| $K_2O$ | 0-0.6 | 0-0.6 |
| $TiO_2$ | 2-3 | 0-8 |
| $ZrO_2$ | 0.5-2 | 0-7 |
| $P_2O_5$ | 0-1 | 0-7 |
| $Sb_2O_3$ | Usual amounts | 0-4 |
| $As_2O_3$ | Usual amounts | 0-2 |
| CaO | 0-0.5 | 0 |
| SrO | 0-1. | 0 |
| Source | EP 1 170 264 B, Claims 14-15 | JP(A) 2004-193050. |

Since the noble metal coating applied to the underside of the glass ceramic plate reflects each defect, which is located on or in the glass ceramic plate, because of its high reflectivity for visible light, these defects would be clearly distinguishable. Then the smallest defects (e.g. bubbles with less than 0.5 mm diameter) are reproduced by reflection at the reflecting underside coating and because of that are observable by an observer as a defect in the product, which interferes with its uniformity.

The reduction of the conspicuousness of the small glass ceramic faults (with a size under 1 mm), such as bubbles, scratches, fused inclusions, or also pits (small depressions in the glass ceramic) succeeds by covering the top surface of the glass ceramic with a conventional decoration comprising a decorative paint in a special grid. Enamel paints are conventional decorative paint, such as described in EP 0 771 765 B1 or DE 197 21 737 C1. Since enamel paints do not sufficiently cover a colorless glass ceramic plate, but still permit observation of the cooking unit interior, it is not possible to completely cover the glass defects by a decoration on the topside of the glass ceramic. Furthermore the eye of the observer must be diverted sufficiently from the faults or defects by the grid, on which the topside decoration would be applied.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
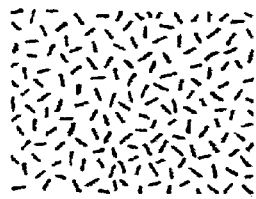
FIG. 1 is a diagrammatic top view of a glass ceramic plate with a decoration on its top surface comprising an unsymmetrical grid, which is effective in concealing defects in the glass ceramic plate.

The typically unsymmetrical grid according to FIG. 1 comprises irregularly oriented dashes or lines with dash lengths from 2.0 to 2.5 mm and dash widths of 0.5 mm, and the grid provides a coverage of 17%. This grid imparts a very non-uniform appearance to the cooking surface and is thus suitable for concealing the defects. Thus the occurring defects in the glass ceramic, or also on the underside noble metal layer, are no longer conspicuous, i.e. they do not "jump out" of the surface.

Figure 2:
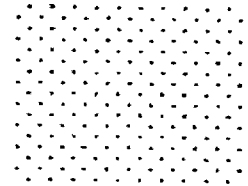
FIG. 2 is a diagrammatic top view of a glass ceramic plate with a decoration on its top surface comprising a symmetrical grid, which is effective in concealing defects in the glass ceramic plate.

Surprisingly the required irregular appearance for concealing the occurring defects or faults in the colorless glass ceramic with the reflecting underside coating can be imparted also by a regular, i.e. symmetric grid with a comparatively small surface coverage according to FIG. 2. The noble metal film on the bottom side of the glass ceramic plate reflects the structural elements of the topside decoration, when the topside decoration has a regular grid whose structural elements are separated from each other by at least 2 mm and at most 4 mm, so that they have coverage of 2 to 12%. Because of that grid structure the entire cooking surface has a non-uniform appearance and the defects or faults in the glass ceramic plate are very satisfactorily concealed. The structural elements of the grid can typically be point-shaped or dash-shaped, i.e. points or dashes. The particular grid shown in FIG. 2 comprises points with a point diameter of 0.5 mm with a smallest point spacing of 2.5 mm. The coverage it provides amounts to 3.4%.

The concealing effectiveness of the decoration decreases when the optimum spacing of the structural elements varies from 2.5 mm (for a 4 mm glass ceramic cooking surface) and an optimum surface coverage varies from 3 to 5%, because a) with larger spacing of the structural elements, i.e. with reduced surface coverage, image and mirror image form an observable unit, so that the desired irregular appearance, which distracts or diverts attention from the defects present, is lost. An observer can clearly and directly view the occurring defects through the open grid, i.e. its structural elements and their mirror images, in a manner similar to the situation with a cooking surface that has a top surface that is not coated or does not have a decoration; and b) with increasingly smaller spacing of the structural elements of the grid, i.e. with increased surface coverage, the mirror images of the structural elements more ever closer together, with the result that the irregular appearance of the cooking surface is lost and the defects, which should be concealed, are observable through the decoration applied to the top side of the cooking surface.

Figure 3A:
FIGS. 3A and 3B are respective diagrammatic top views of glass ceramic plates with corresponding decorations on their top surfaces comprising different symmetrical grids or patterns, which are not effective in concealing defects.
Figure 3B:
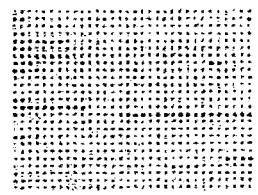

FIGS. 3A and 3B show two decorations with grids that do not sufficiently conceal the defects of the glass ceramic.

In the case of the glass ceramic plate shown in FIG. 3A the spacing of the structural elements is less than 2 mm and the defects are insufficiently concealed as a result. In the case of the glass ceramic of FIG. 3A the grid has a point diameter of 0.4 mm, the smallest point spacing is 0.82 mm, and the coverage degree is 20%.

In the case of the glass ceramic plate shown in FIG. 3B the coverage is over 12% respectively and the defects are insufficiently concealed. In the case of the glass ceramic of FIG. 3B the grid has a point diameter of 0.5 mm, the smallest point spacing is 1.2 mm, and the coverage degree is 13%.

The topside decoration reduces the reflective action of the lower side coating, which is desirable for aesthetic reasons, besides the concealment of the occurring defects.

Furthermore the color impression of the entire cooking surface can be changed by variation of the color of the topside decoration (e.g. white, grey, brown). Since the decorative paints applied to the top side are not concealing, but are transparent or translucent, the interesting effect that the color change of the cooking surface observed by the observer is associated with the metallic lustrous lower side coating and not with the topside decoration. For example, the cooking surfaces, which are provided with one and the same lustrous silver lower side coating, appear bright silver with white top surface decorations, dark silver with grey top surface decorations and bronze with brown top surface decorations.

The brightness of the bottom side coating can be changed by variation of the coating thickness of the noble metal film. The coatings are darker, when the coating thickness is increased. Thus a first layer, with which the cooking surface is completely covered, can be applied by screen printing when a screen printable noble metal preparation is employed. Then a second layer comprising a firm logo, among other things, can be printed, which is emphasized by the silver first layer so that it appears darker after burn-in.

The above-described noble metal coatings are surprisingly suitable for induction heated cooking plates despite their high electrical conductivity besides the cook top application for gas ranges. The bake-in time amounts to from 9 to 12 min depending on the type of cook top and its water content. Thus it is within the usual time frame. It is comparable with the bake-in times, which are obtained for radiantly heated cook tops made from conventional black glass ceramic, e.g. CERAN HIGHTRANS®.

The underside coating could be scratched by components within the cooking range, which are applied to or mounted from below on the cooking plate, e.g. the mica plate on the induction coil or the metal plate in the vicinity of an electrically heated warming zone, in induction applications in which noble metal preparations are used as underside coatings in cooking ranges. A coating based on silicones, polyamides, or polyimides can be applied to the noble metal film as an effective scratch preventative layer, which does not impair the application properties of the noble metal film.

The above-described opaque noble metal coatings according to the invention are not suitable for the heated area of a radiantly heated cooking surface, since the infrared radiation from the heating element is too strongly reflected from the coating, so that a satisfactory cooking time is not achievable. The spectral transmission of the above-described noble metal film in the infrared (800 nm to 6000 nm) and in the visible wavelength range (350-800 nm) is under 12%, better from 0 to 4%. The above-described noble metal film thus differs from that described in the above-cited JP H7-17409 and has a transmission of 12 to 87% in the infrared range. Generally if the coating according to the invention is omitted from the cooking zone or replaced by another opaque coating, the glass ceramic plate can be also used from a radiantly heated cooking surface. The coating according to the invention can also be omitted from the display regions or in the region of the light indicator device or in the region of other operating elements, such as the touch control unit of the cooking surface in addition to the heated areas.

The following examples illustrate the above-described invention in more detail, but the details in these examples should not be considered as limiting the claims appended hereinbelow.

EXAMPLES

Example 1

Silvery Underside Coating

A colorless glass ceramic plate with a composition according to EP 1,170,264 B1 (Table I, left column) was coated on its topside with a white decorative paint according to DE 197 21 737 C1 and coated and ceramicized to form a regular concealing grid according to FIG. 2. Subsequently a commercially obtained silver-free noble metal preparation GPP 4510 (HERAEUS, Hanau) was applied to the underside of the ceramicized glass ceramic plate by means of screen printing (sieve width 140-31) and dried for about 3 hours at 20° C. Then the coated glass ceramic was heated at 1 K/min to 830° C. and the coating was burned in for 1 hour at 830° C. After the burn-in the underside of the glass ceramic plate had a silvery coating (see also experiment 1 in Table II).

The noble metal fraction of the paint amounts to 11% by weight (89% by weight burn-in loss). The noble metal film is composed (in % by weight) from 60 to 90% gold, 16 to 24% platinum, 0.5 to 2% rhodium, and 0 to 1% bismuth and chromium.

The finished glass ceramic plate was built into a cook range for gas cooking applications in order to provide a cooking surface.

Soya and oil were applied to the underside coating and burned-in by operation of the cooking range in order to test the resistance to food. Black flecks resulting from the burn-in of oil and Soya sauce arise on the side, which faces away from, and thus is inaccessible to, the operator. However these flecks were not observable from the topside of the glass ceramic cooking surface. The coating was also not damaged, e.g. loosened, among other damaging events. i.e. the coating was sufficiently resistant to food materials.

Figure 4:
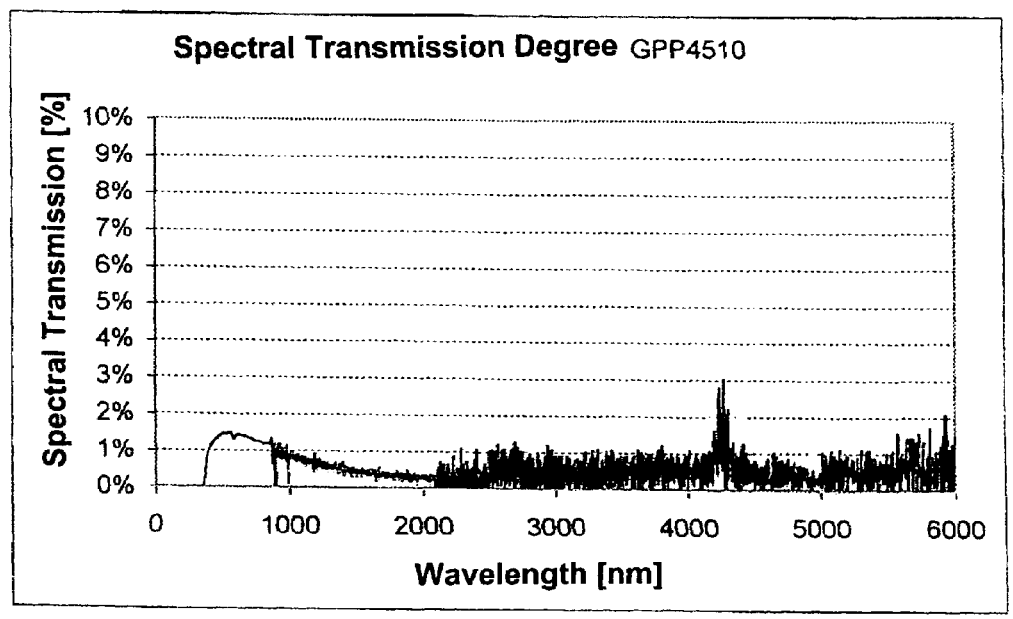
FIG. 4 is a graphical illustration of the spectral transmission of an example of the glass ceramic plate according to the invention with the at least one noble metal coating on the underside of the glass ceramic plate.

The opacity was tested, when the built-in cook top was observed both with daylight (D65 L 18 Watt/72-965, 6500 K) and with light of a halogen radiator of a cooking area (Bosch-Siemans Household Appliance, B/S/H). Since the interior structure of the cooking unit could not be observed in both cases, the underside coating is sufficiently opaque. The spectral transmission of the glass ceramic plate with the coating on its underside but without the decoration on the topside is less than 1.5% in the visible wavelength range according to the transmission curve shown in FIG. 4.

The temperature resistance was tested, when the glass ceramic plate was heated in an oven for 24 hours at 550° C. No color difference was found when the color shade was subsequently compared with a reference. Also the adherence of the coating was sufficient after tempering. It was tested with a "TESA test", in which a strip of transparent adhesive film was pasted on the underside coating and then torn off of it (TESA-FILM® Type 104, Beiersdorf AG). Since no particles of coating could be found on the adhesive strip under normal visual observation without magnification, the coating was judged to be sufficiently thermally stable.

The concealing action of the grid, with which the glass ceramic plate was decorated on its topside, was judged, when defects in the glass ceramic plate were observed in the glass ceramic substrate or in the coating on its underside. The observed defects were not discovered or found to be not troublesome when the glass ceramic substrate was observed from 50 cm distance.

Example 2

Shiny Golden Underside Coating

Another similarly silver-free noble metal preparation (GGP 070505, HERAEUS, Hanau) was used in a manner similar to example 1 to provide a glass ceramic substrate with a shiny or lustrous golden underside coating. The resistance to food materials, the opacity, the temperature resistance (including adherence), and the concealing action of the topside decoration were found to be satisfactory according to the above-described tests.

Example 3

Variation of Underside Color Shades

The silver color shade of the noble metal preparation GPP 4510 described in example 1 could be changed by application of a white paint layer, without impairing the application properties of the underside coating. Moreover the ceramicized glass ceramic plate was first coated with GPP 4510 by means of screen printing (Sieve width 140-31). An additional paint layer of GPP 4510 was printed over the first paint layer and dried after that. After burn-in at 830° C. the color parameters were measured with a spectrophometer (Mercury 2000, Datacolor GmbH). Comparison of the color parameters of the one layer system with the associated two-layer system showed that the color parameters changed slightly. The color parameters are tabulated in Table II.

TABLE II

COLOR PARAMETERS L*, a*, b* FOR DIFFERENT NOBLE METAL LAYER SYSTEMS

| Test | Body tested | L* | a* | b* | Color difference ΔE |
|---|---|---|---|---|---|
| 1 | Single silver layer | 71.0 | 2.4 | 11.2 | 0.7 |
| 2 | Twofold silver layer | 70.4 | 2.7 | 11.4 | |
| 3 | Single gold layer | 73.9 | 8.6 | 33.7 | 1.6 |
| 4 | Twofold gold layer | 73.9 | 8.9 | 35.3 | |
| 5 | 1. Silver layer 2. Gold layer | 71.1 | 7.5 | 21.7 | — |
| 6 | Colorless substrate according to Table I, left column without coating, with underlying white layer | 88.9 | −1.0 | 6.2 | — |
| | White layer alone | 96.3 | −0.4 | 2.5 | — |

The color parameters were measured through the above-described substrate, i.e. from the standpoint of the observer Color measuring apparatus:

Mercury 2000, Datacolor GmbH. Noble metal preparations:

"Silver": GPP 4510, Heraeus and "Gold": GGP 070505, Hereus.

Other noble metal preparations can also be selected as the second paint layer. For example a shiny silver noble metal preparation, a shiny platinum preparation, a noble metal preparation that produces a shiny gold layer after burn-in, or a lustrous gold preparation can be applied. A bronze color shade (Table II, experiment 5) can be produced by a combination of both noble metal preparations, e.g. GPP 4510 and GGP 070505.

Coating thickness variations produce color nuance differences in the color shade of the underside coating. A multicolored underside coating may be produced using different noble metal preparations.

Comparative Example 4

Chemically Not-Resistant Gold Preparation

A commercially obtained silver-containing shiny gold preparation GGP 1213-10% (Heraeus, Hanau) similar to example 1 was printed on the underside of a glass ceramic plate that provides a cooking surface and was burned in the undersurface. This comparative example is for comparison to the chemically resistant shiny gold preparation GGP 070505 (Example 2), which is resistant to food materials.

The noble metal fraction of the paint amounts to 10% by weight (90% by weight burn-in loss). The noble metal coating is composed of 11 to 17% by weight silver, 66 to 88% by weight gold, 0.5 to 2% by weight rhodium and bismuth each, and 0 to 1% by weight silicon.

The finished glass ceramic plate was built into a cook top for gas cooking applications in order to provide a cooking surface.

Soya and oil were applied to the underside coating and burned-in by operation of the cooking range in order to test the resistance to food. Black flecks resulting from the burn-in of oil and Soya sauce arise on the side, which faces away from, and thus is inaccessible to, the operator. These flecks were observable from the side of the glass ceramic cooking surface that faces the user as brownish colored regions. In other words the coating that was not according to the present invention was not sufficiently resistant to food materials.

Example 5

Silicone Paint for Increased Abrasion Resistance

The entire surface on the underside of a glass ceramic plate, which was prepared in the same manner as the plate in example 1, was additionally coated with heat-resistant black silicone paint (GSX, Daishin Paint) by screen-printing (Screen cloth 54-64). The paint was dried for 5 min at 180° C. and subsequently burned in for 30 min at 400° C. The finished glass ceramic plate was built into a cook top (Bosch-Siemans Household Appliance, B/S/H) with induction heating means to provide a cooking surface. The resistance of the underside coating to abrasively acting components (mica plates over induction coils, metal plates of the warming zone) was tested by repeatedly turning on and off all heating areas and the warming zone at maximum power for ten times. An observer subsequently viewing the cooking surface from the topside of the cooking surface could observe no scratches or tears. The underside coating thus was sufficiently abrasion resistant. The properties measured in example 1 were not impaired by the presence of the silicone paint. Furthermore the resistance to damage by food materials was increased still further by the additional silicone layer, since the silicone paint prevents a direct contact of the food material with the noble metal layer and thus acts as a "sacrificial" layer.

The examples of the present invention primarily concern a colorless glass ceramic, i.e. a glass ceramic that is not colored in the melt. However the glass ceramic could also be slightly colored (e.g. brown, rod, or even blue). Thus the underside coating according to the invention provides an opaque colored glass ceramic or an opaque ceramicized glass ceramic, through which one can no longer see.

The disclosure in German Patent Application 10 2005 046 570.6-45 of Oct. 1, 2005 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a glass ceramic plate providing a cooking surface for a cooking apparatus and having a coating on an underside thereof and coating process for making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A glass ceramic plate formed to provide a cooking surface of a cooking unit, wherein said glass ceramic plate is composed of a glass ceramic material, which is transparent to visible light as well as IR radiation, and wherein said glass ceramic plate has a noble metal film coated on an underside of the glass ceramic plate and a grid-shaped decoration on a topside of the glass ceramic plate; and wherein the noble metal film comprises an alloy of gold and/or platinum and/or palladium, which imparts a reflective property to the noble metal film; the noble metal film contains from 90 to 100% by weight of at least one noble metal, in relation to a total amount of film material in the noble metal film, and from 0 to 5 percent by weight, in relation to a total metal content of the noble metal film, of silver, copper, silicon, bismuth and other metals that are not noble metals; and the glass ceramic plate coated with the noble metal film has a spectral transmission of 0 to 4% in the visible region of the spectrum.

2. The glass ceramic plate as defined in claim 1, wherein the noble metal film contains from 0 to 1% by weight, in relation to the total metal content, of silver, copper, silicon, bismuth and other metals that are not noble metals.

3. The glass ceramic plate as defined in claim 1, wherein the noble metal film contains from 95 to 100% by weight, in relation to the total amount of the film material in the noble metal film, of the at least one noble metal.

4. The glass ceramic plate as defined in claim 1, wherein the noble metal film has a thickness less than one micron.

5. The glass ceramic plate as defined in claim 4, wherein the thickness of the noble metal film amounts to from 0.05 to 0.5μ.

6. The glass ceramic plate as defined in claim 4, wherein the thickness of the noble metal film amounts to from 0.1 to 0.2μ.

7. The glass ceramic plate as defined in claim 1, wherein the noble metal film is applied by screen printing to the underside of the glass ceramic plate.

8. The glass ceramic plate as defined in claim 1, wherein the glass ceramic material has a composition in percent by weight on an elemental oxide basis of:

| | |
|---|---|
| $SiO_2$ | 66-70 |
| $Al_2O_3$ | >19.8-23 |
| $Li_2O$ | 3-4 |
| MgO | 0-1.5 |
| ZnO | 1-2.2 |
| BaO | 0-2.5 |
| $Na_2O$ | 0-1 |
| $K_2O$ | 0-0.6 |
| $TiO_2$ | 2-3 |
| $ZrO_2$ | 0.5-2 |
| $P_2O_5$ | 0-1 |
| CaO | 0-0.5 |
| SrO | 0-1. | and at least one elemental oxide selected from the group consisting of $As_2O_3$ and $Sb_2O_3$.

9. The glass ceramic plate as defined in claim 1, wherein the glass ceramic material has a composition in percent by weight on an elemental oxide basis of:

| | |
|---|---|
| $SiO_2$ | 50-80 |
| $Al_2O_3$ | 12-30 |
| $Li_2O$ | 1-6 |
| MgO | 0-5 |
| ZnO | 0-5 |
| BaO | 0-8 |
| $Na_2O$ | 0-5 |
| $K_2O$ | 0-0.6 |
| $TiO_2$ | 0-8 |
| $ZrO_2$ | 0-7 |
| $P_2O_5$ | 0-7 |
| $Sb_2O_3$ | 0-4 |
| $As_2O_3$ | 0-2 |
| CaO | 0 |
| SrO | 0. |

10. The glass ceramic plate as defined in claim 1, wherein the grid-shaped decoration comprises a plurality of point-like, dash-like, or unsymmetrical structural elements.

11. The glass ceramic plate as defined in claim 1, wherein the grid-shaped decoration comprises a plurality of stochastically distributed structural elements.

12. The glass ceramic plate as defined in claim 1, wherein the grid-shaped decoration comprises a plurality of symmetrically distributed structural elements.

13. The glass ceramic plate as defined in claim 12, wherein said structural elements cover from 2 to 12% of an entire top surface of the glass ceramic plate and opposing edges of said structural elements are spaced at least 2 mm and at most 4 mm from each other.

14. The glass ceramic plate as defined in claim 12, wherein said structural elements cover from 3 to 5% of an entire top surface of the glass ceramic plate and opposing edges of said structural elements are spaced 2.5 mm from each other.

15. The glass ceramic plate as defined in claim 1, wherein said noble metal film comprises a plurality of individual layers and covers individual parts or all of said underside of said glass ceramic plate.

16. The glass ceramic plate as defined in claim 15, wherein said individual layers are printed or pressed layers.

17. The glass ceramic plate as defined in claim 15, wherein said individual layers are made of different noble metal preparations having a different composition.

18. The glass ceramic plate as defined in claim 15, wherein at least one of the individual layers completely covers the underside of the glass ceramic plate.

19. The glass ceramic plate as defined in claim 15, wherein at least one of said individual layers does not completely cover the underside of the glass ceramic plate, but instead comprises a geometric figure, a grid, or handwritten letters.

20. The glass ceramic plate as defined in claim 1, wherein the noble metal film does not extend or cover heated areas, display areas, light indicator signal devices, or other operating elements.

21. The glass ceramic plate as defined in claim 20, wherein said other operating elements comprise touch control elements.

22. The glass ceramic plate as defined in claim 1, having a spectral transmission of 0 to 12% in the infrared region of the spectrum.

23. The glass ceramic plate as defined in claim 1, wherein said spectral transmission in the visible region of the spectrum is from 0 to 1.7%.

24. The glass ceramic plate as defined in claim 1, wherein said noble metal film is free of silver.

25. The glass ceramic plate as defined in claim 1, wherein said noble metal film includes at least one film stabilizer.

* * * * *